US010773261B2

(12) United States Patent
Bianca et al.

(10) Patent No.: US 10,773,261 B2
(45) Date of Patent: Sep. 15, 2020

(54) SYSTEM, METHOD AND APPARATUS FOR CONTROLLING THE FLOW DISTRIBUTION OF SOLID PARTICLES (71) Applicant: GENERAL ELECTRIC TECHNOLOGY GMBH, Baden (CH)

(72) Inventors: Joseph David Bianca, Southampton, MA (US); Paul John Chapman, Windsor, CT (US)

(73) Assignee: General Electric Company, Schenectady, NY (US)

( * ) Notice: Subject to any disclaimer, the term of this patent is extended or adjusted under 35 U.S.C. 154(b) by 923 days.

(21) Appl. No.: 15/055,978

(22) Filed: Feb. 29, 2016

(65) Prior Publication Data
US 2017/0246642 A1  Aug. 31, 2017

(51) Int. Cl.
*B02C 23/12* (2006.01)
*B02C 23/30* (2006.01)
*B07B 7/086* (2006.01)
*F23K 3/02* (2006.01)
*F23K 1/00* (2006.01)
*F02K 1/00* (2006.01)

(52) U.S. Cl.
CPC .............. *B02C 23/30* (2013.01); *B02C 23/12* (2013.01); *B07B 7/086* (2013.01); *F02K 1/00* (2013.01); *F23K 1/00* (2013.01); *F23K 3/02* (2013.01); *F23K 2201/101* (2013.01); *F23K 2201/1003* (2013.01); *F23K 2201/1006* (2013.01); *F23K 2201/30* (2013.01); *F23K 2203/006* (2013.01)

(58) Field of Classification Search
CPC ......... B02C 23/30; B02C 23/10; B02C 23/12; B02C 23/32; B02C 15/00; B02C 15/007; B02C 15/002; B07B 7/086; F02K 1/00; F23K 1/00; F23K 3/02
USPC ........... 241/117–121, 79.1, 52; 454/187, 167
See application file for complete search history.

(56) References Cited

U.S. PATENT DOCUMENTS

| | | | |
|---|---|---|---|
| 6,257,415 B1 | 7/2001 | Wark | |
| 6,607,079 B2 | 8/2003 | Laux | |
| 7,549,382 B2 | 6/2009 | Levy et al. | |
| 8,136,746 B2 | 3/2012 | Martin et al. | |
| 8,181,584 B2 | 5/2012 | Biligen et al. | |
| 8,845,404 B2 * | 9/2014 | Bash | F24F 13/105 454/167 |
| 2004/0188554 A1 | 9/2004 | Levy et al. | |
| 2010/0320298 A1 * | 12/2010 | Martin | B02C 23/32 241/30 |

(Continued)

OTHER PUBLICATIONS

International Search Report and Written Opinion issued in connection with corresponding PCT Application No. PCT/IB2017/000234 dated Jun. 26, 2017.

*Primary Examiner* — Kenneth E Peterson
*Assistant Examiner* — Nhat Chieu Q Do
(74) *Attorney, Agent, or Firm* — Hoffman Warnick LLC (57) ABSTRACT

A deflector ring includes a generally annular body, and a plurality of static straightening vanes arranged interior to the body, the vanes dividing the body into a plurality of substantially equal sections. The vanes are configured to straighten a swirling flow of solid particles as they enter the annular body, and to divide the swirling flow into a plurality of straightened flows that are communicated to a turret positionable above the deflector ring.

11 Claims, 7 Drawing Sheets

(56) References Cited

U.S. PATENT DOCUMENTS

2012/0243969 A1\* 9/2012 Lin ................ B23P 17/04
 414/804
2015/0056024 A1\* 2/2015 Rath ................ F23K 3/02
 406/3

\* cited by examiner

SYSTEM, METHOD AND APPARATUS FOR CONTROLLING THE FLOW DISTRIBUTION OF SOLID PARTICLES

BACKGROUND

Technical Field

Embodiments of the invention relate to pulverized coal boilers and, more particularly, to a system, method and apparatus for controlling the flow distribution of coal between outlet pipes of a pulverizer.

Discussion of Art

Coal fired boilers utilize pulverizers to grind coal to a desired fineness so that it may be used as fuel for burners. In a typical pulverized coal boiler, coal particulate and primary air flow from the pulverizers to the burners through an array of coal pipes leading from the pulverizers to the burners. Typically, raw coal is fed through a central coal inlet at the top of the pulverizer and falls by gravity to the grinding area at the base of the mill. Once ground using one or more of a variety of known methods, the pulverized coal is transported upwards using air as the transport medium. The pulverized coal passes through classifier vanes within the pulverizer. These classifier vanes may vary in structure, but are intended to establish a swirling flow within the classifier and rejects cone to prevent coarse coal particles from flowing into the discharge turret of the pulverizer. The centrifugal force field set up in the rejects cone forces the coarse coal particles to drop back down onto the grinding surface to be reground until the desired fineness is met. Once the coal is ground finely enough, it is discharged from the pulverizer and distributed among multiple pulverized coal outlet pipes and into respective fuel conduits where it is carried to the burners.

Figure 1:
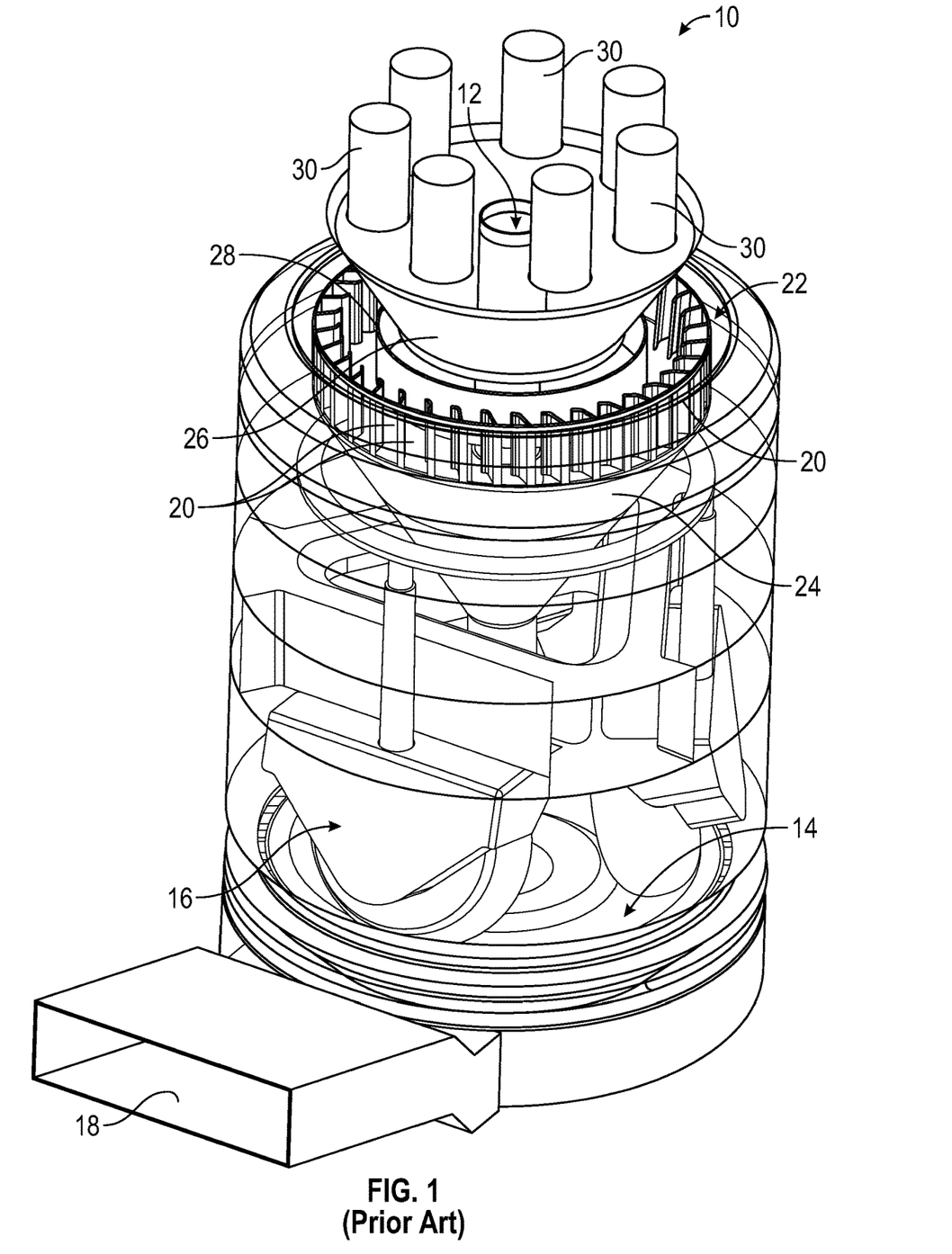
FIG. 1 is a perspective view of a coal pulverizer or mill of the prior art.

With reference to FIG. 1, in a conventional coal pulverizer 10, raw coal is fed into a coal inlet pipe and by force of gravity falls through a centrally located coal chute 12 until it reaches a grinding platform 14 where a grinding mechanism 16 grinds the coal into fine pieces. Air flows into an air inlet port 18, feeding primary air into the pulverizer 10. This creates a stream of air that carries the particles of pulverized coal upward from the grinding platform 14 where they enter classifier vanes 20 of a classifier 22 that establish a swirling flow within a the classifier and reject cone 24. The centrifugal force set up in the reject cone 24 prevents coarse pieces of coal from entering the discharge turret 26, as discussed above. The coarse pieces of coal fall by force of gravity back into the grinding platform 14, to be reground by the grinding mechanism 16 until they reach a desired degree of fineness. The pulverized coal that is not too coarse, however, is directed by the swirling flow of air upwards through a deflector ring 28 of the classifier 22, and into the discharge turret 26 located above the deflector ring 28. Once the pulverized coal enters the discharge turret 26 it is distributed between the multiple pulverized coal outlet pipes 30 (FIG. 1 shows seven pulverized coal outlet pipes at the top of the turret 26). The pulverized coal is then carried by connected fuel conduits (not shown) to a boiler where it is burned as fuel.

Figure 2:
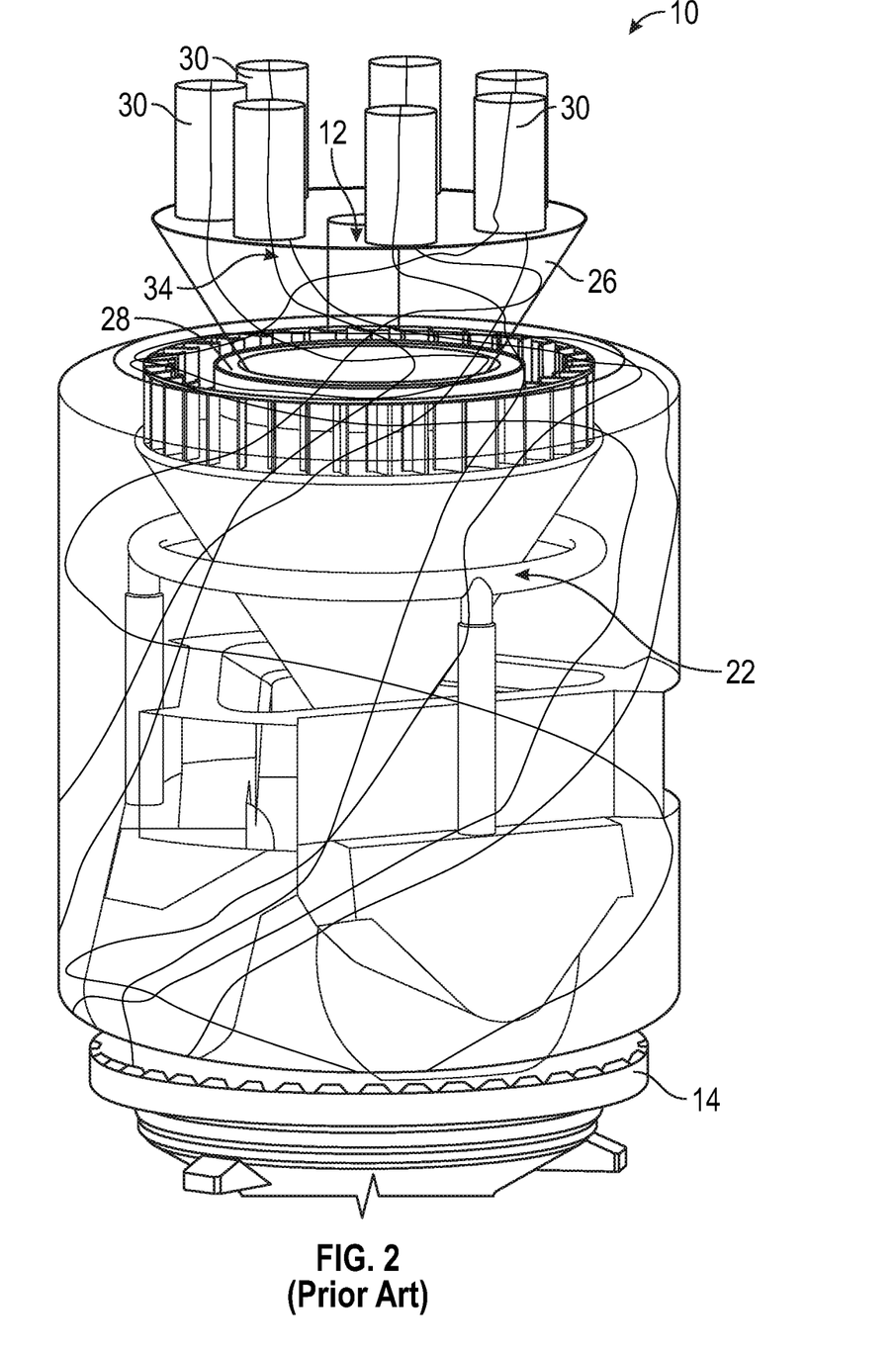
FIG. 2 is a detail, perspective view of an upper portion of the coal pulverizer of FIG. 1, showing the travel of coal particles.
Figure 3:
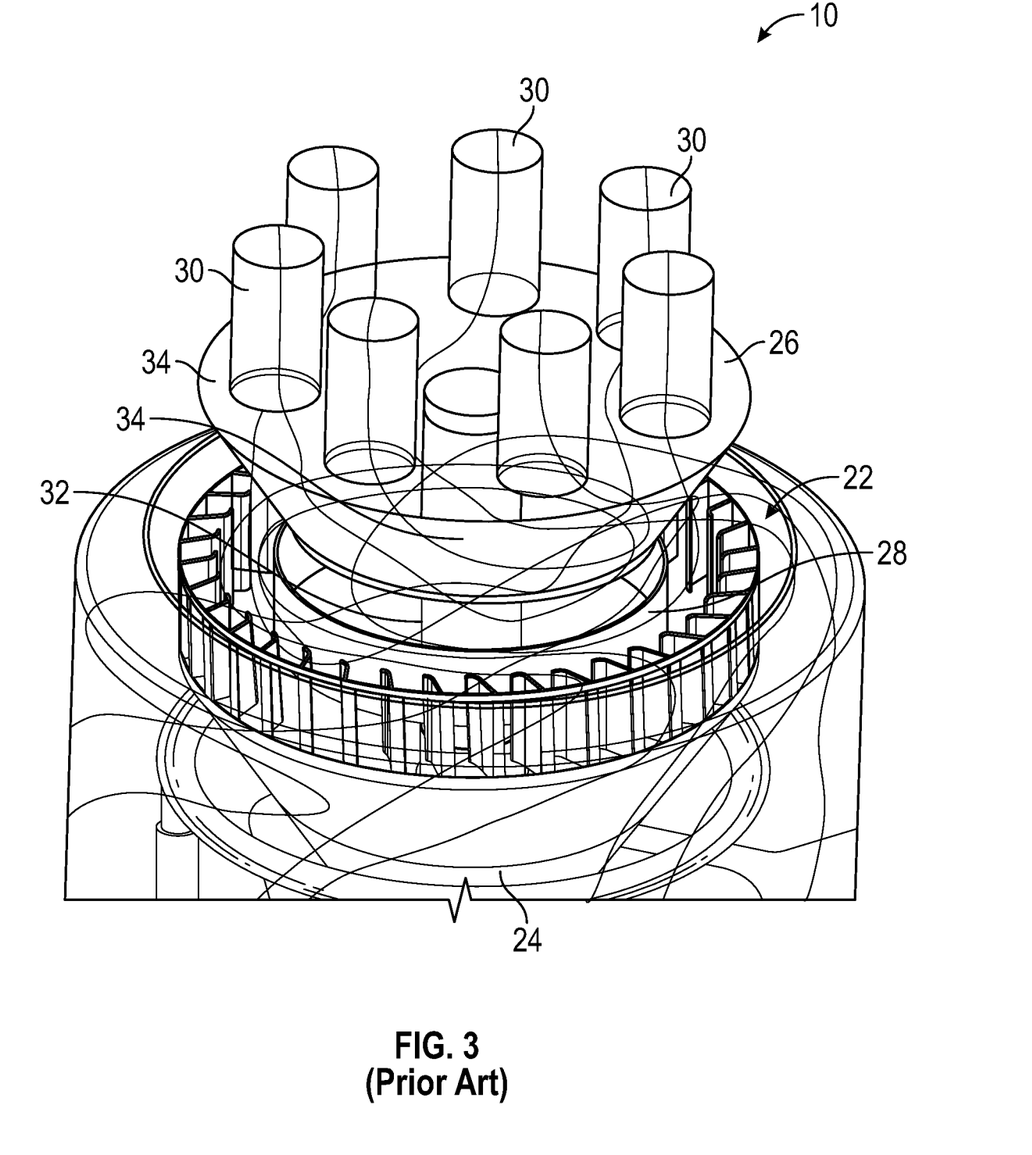
FIG. 3 is a detail, perspective view of a classifier and turret of the coal pulverizer of FIG. 1, showing the travel of coal particles within the classifier, turret and outlet pipes.

While the swirling flow of pulverized coal is efficient in preventing coarse coal particles from being carried upward to the coal pipes, such swirling flow has also been known to create an imbalance in coal flow distribution between the coal pipes 30. As illustrated by the particle tracking diagrams of FIGS. 2-4, the swirling flow created in the classifier 22 also extends into the deflector ring 28 and the turret 26, leading to an imbalanced distribution of coal between the various pipes 30. In particular, as shown in FIGS. 2 and 3, the trajectory 32 of coal particles within the deflector ring 38 has a substantially horizontal component, and only a slight vertical component. The same is true for the trajectory 34 of coal particles within the turret 26. This has been shown to lead to a greater distribution of coal into some of the pipes as compared to others (see, e.g., FIG. 3, where the coal pipe at the bottom right receives a lesser flow of coal particles as compared to the others).

This unbalanced distribution of coal among the coal outlet pipes can adversely affect the performance of each burner and the boiler as a whole and can lead to decreased combustion efficiency, increased potential for tube fouling, furnace slagging, and non-uniform heat release within the combustion chamber. In addition, unbalanced distribution of coal can also result in the inability to control individual burner stoichiometry (i.e., the air-to-coal ratio), which can lead to elevated emissions of nitric oxides, carbon monoxide and the like.

In view of the above, there is a need for a system and method for ensuring a more uniform distribution of coal between the various outlet pipes of a pulverizer in order to improve overall system efficiency and performance.

BRIEF DESCRIPTION

In an embodiment, a deflector ring for a pulverizer is provided. The deflector ring includes a generally annular body, and a plurality of static straightening vanes arranged interior to the body, the vanes dividing the body into a plurality of sections. The vanes are configured to straighten a swirling flow of solid particles as they enter the annular body, and to divide the swirling flow into a plurality of straightened flows that are communicated to a turret positionable above the deflector ring.

In another embodiment, a method for controlling the output of coal in a plurality of coal outlet pipes in a coal pulverizer is provided. The method includes the steps of modifying, or retrofitting, a portion of a coal pulverizer with a deflector ring, the deflector ring comprising a generally annular body, and a plurality of static straightening vanes arranged interior to the body. The vanes divide the body into a plurality of sections.

In yet another embodiment, a classifier for a coal pulverizer is provided. The classifier includes a plurality of classifier vanes arranged in an annular ring, and a deflector ring concentrically arranged within the annular ring. The deflector ring has a generally annular body and a plurality of static straightening vanes arranged interior to the body. The straightening vanes divide the body into a plurality of sections. The classifier vanes are configured to generate a swirling flow of coal within the classifier. The straightening vanes within the annular body are configured to straighten the swirling flow of coal as it enters the annular body, and to divide the swirling flow into a plurality of straightened flows that are communicated to a turret positionable above the classifier.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. While embodiments of the invention are directed to systems and methods for controlling the flow distribution of pulverized coal in a pulverizer and, in particular, for controlling the flow distribution of coal to burner coal pipes on front and rear fired boilers, embodiments of the invention may be also applicable to controlling the flow distribution of coal to burner coal pipes on any type of boiler, and to controlling the flow of solid particles, generally.

As used herein, "operatively coupled" refers to a connection, which may be direct or indirect. The connection is not necessarily being a mechanical attachment. As used herein, "fluidly coupled" or "fluid communication" refers to an arrangement of two or more features such that the features are connected in such a way as to permit the flow of fluid between the features and permits fluid transfer.

Figure 4:
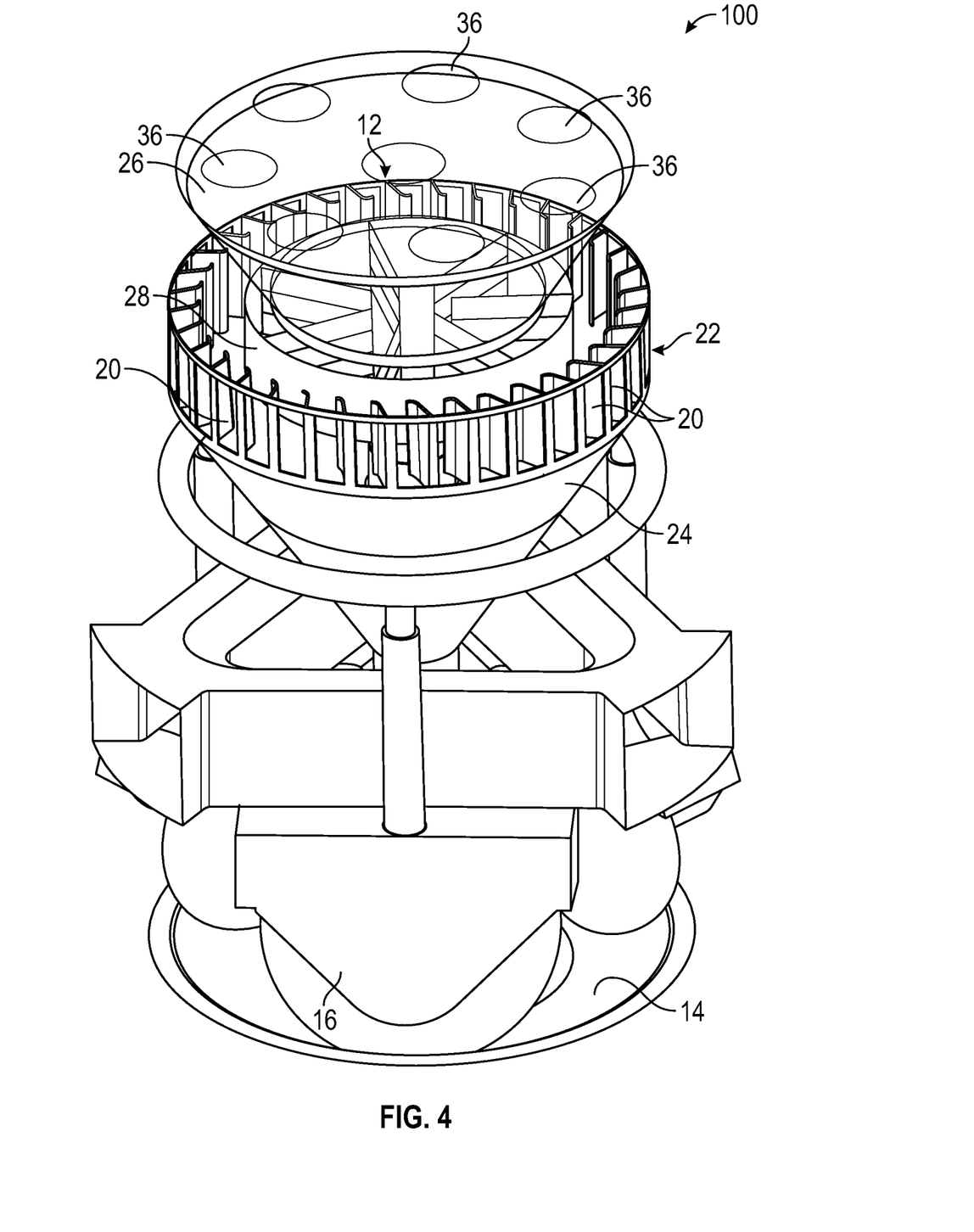
FIG. 4 is a perspective view of a coal pulverizer or mill according to an embodiment of the invention.

Embodiments of the invention relate to a system and method for controlling the flow distribution of solid particles, namely coal, in a pulverizer or mill for a coal fired boiler. As illustrated in FIG. 4, a pulverizer 100 according to an embodiment of the present invention is generally similar in configuration to pulverizer 10 described above, where like reference numerals designate like parts. The pulverizer 100 includes a coal chute 12 configured to receive a supply of raw coal and to feed the coal, by force of gravity, to a grinding platform or table 14. At the grinding platform 14, a grinding mechanism 16 of any known type and configuration is operable to grind the raw coal into fine particles. Arranged above the grinding platform 14 is a classifier 22 having a plurality of vanes 20 arranged in an annular ring above a reject cone 24. As illustrated in FIG. 4, the classifier 22 also includes a deflector ring 28 defining an annular or cylindrical body concentrically arranged within the annular ring of vanes 20 and through which the coal chute 12 extends. A turret 26 is fluidly coupled to the classifier 22 (through the passageway defined by the deflector ring 28) and is positioned thereabove. The turret 26 defines a generally conical shaped body having a plurality of outlets 36 at the top thereof. The outlets 36 are in fluid communication with a corresponding number of outlet pipes, such as coal outlet pipes 30, that lead to fuel conduits (not shown) configured to carry pulverized coal to the burners of the boilers for combustion.

In an embodiment, the classifier 22 is a static classifier. In other embodiments, the classifier 22 may be a dynamic classifier. In an embodiment, the vanes 20 of the classifier 22 may be selectively adjustable in order to control the relative fineness or coarseness of coal particles according to system operating parameters. For example, one or more of the vanes 20 may be pivotable about a vertical axis.

Figure 5:
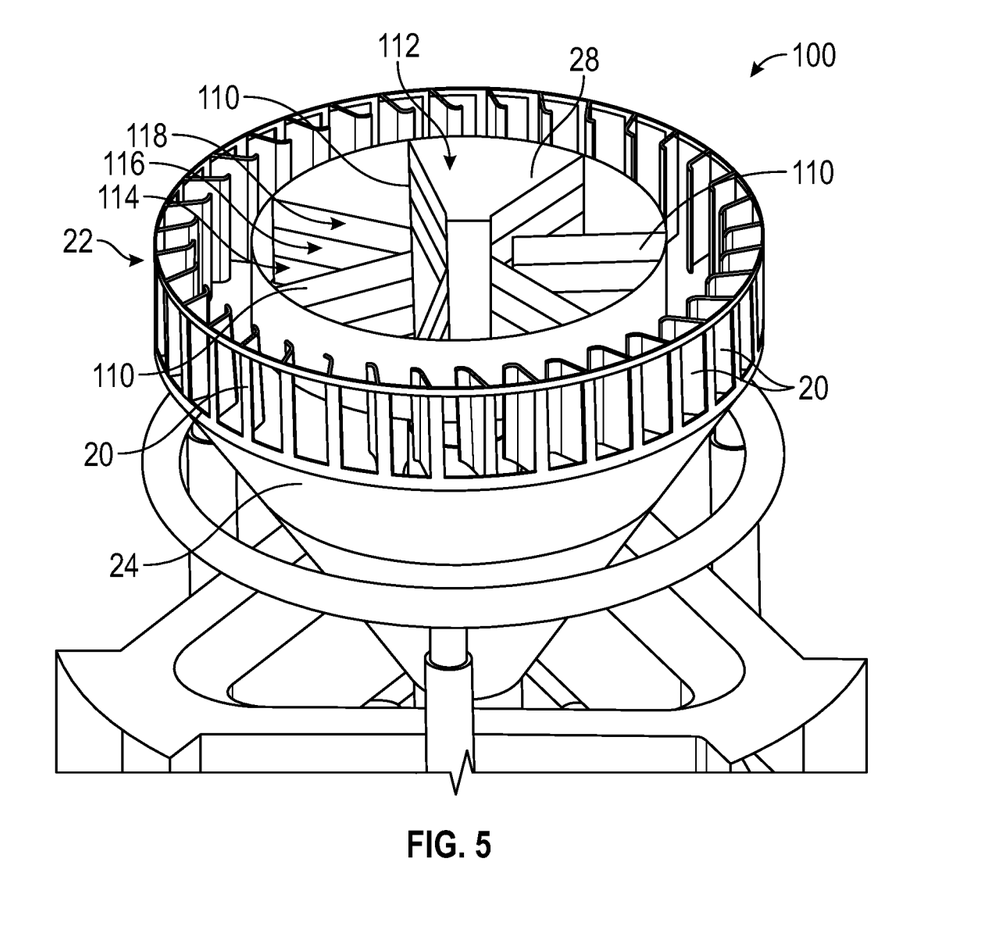
FIG. 5 is a detail, perspective view of a classifier of the coal pulverizer of FIG. 4.

Referring now to FIG. 5, the deflector ring 28 of the classifier 22 includes a plurality of flow straightening vanes 110 arranged therein that divide the interior of the deflector ring 28 into a plurality of sections 112 of equal size. The vanes 110 extend radially outward from a peripheral surface of the coal chute 12 to the interior walls of the deflector ring 28, and have a height that is substantially equal to a height of the deflector ring 28. In an embodiment, the vanes 110 are static vanes 110, meaning that they are in fixed position within the deflector ring 28 and unable to rotate about any axis. In an embodiment, the number of vanes 110 and sections 112 created by the vanes 110 corresponds to the number of outlets 36 in the turret 26. For example, as illustrated in FIGS. 4 and 5, the deflector ring 28 may include seven straightening vanes 110 that divide the deflector ring into seven wedge-shaped sections corresponding to the seven outlets 36 in the turret 26. While seven vanes 110 are illustrated in FIG. 5, it is envisioned that the number of vanes 110 (and thus sections 112) within the deflector ring 28 will be dictated by the number of outlets 36 in the turret 26, which may vary between applications or installations.

In operation, raw coal is fed into the coal inlet pipe and by force of gravity falls through the centrally located coal chute 12 until it reaches the grinding platform 14 where the grinding mechanism 16 grinds the coal into fine pieces. Air flows into an air inlet port (not shown) below the grinding platform 14, feeding primary air into the pulverizer 100. This creates a stream of air that carries the particles of pulverized coal upward from the grinding platform 14 where they enter the classifier vanes 20 of the classifier 22. These vanes 20 establish a swirling flow within the classifier and reject cone 24. The centrifugal force set up in the reject cone 24 prevents coarse pieces of coal from entering the discharge turret 26. In particular, coarse pieces of coal fall by force of gravity back into the grinding platform 14, to be reground by the grinding mechanism 16 until they reach a desired degree of fineness. The pulverized coal that is not too coarse, however, is carried by the swirling flow of air upwards through the deflector ring 28 of the classifier 22. In particular, the pulverized coal that is not rejected passes upwards into the sections 112 of the deflector ring 28 defined by the vanes 110. After passing through the sections 112 of the deflector ring 28, the coal continues upwards through the turret 26 and enters the respective coal outlet pipes 30 through the outlets 36, where the coal is fed to one or more burners where it is combusted.

Figure 6:
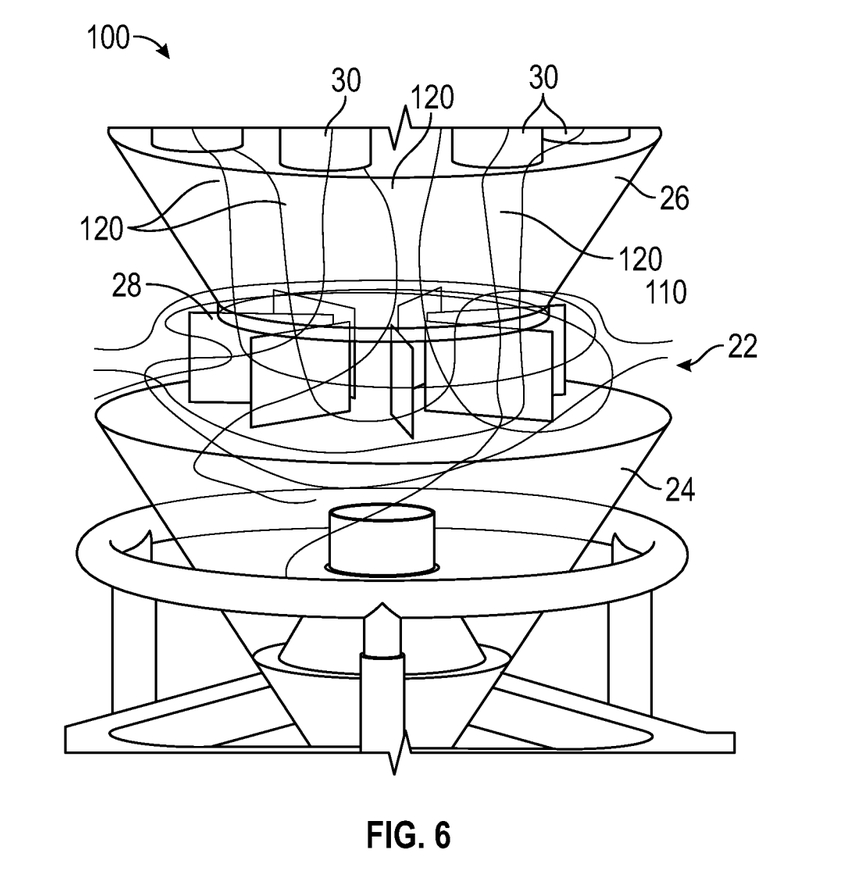
FIG. 6 is a detail, perspective view of an upper portion of the coal pulverizer of FIG. 4, showing the travel of coal particles within the classifier and turret.
Figure 7:
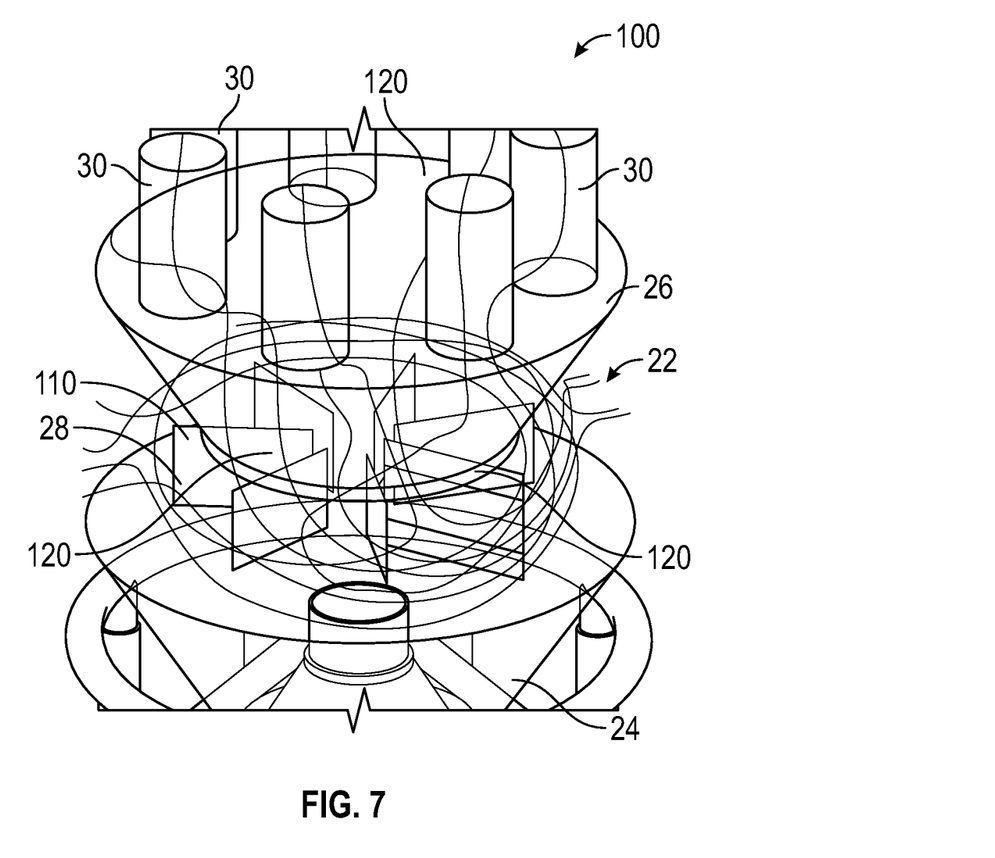
FIG. 7 is another detail, perspective view of an upper portion of the coal pulverizer of FIG. 4, showing the travel of coal particles within the classifier, turret and outlet pipes.

As best shown in FIGS. 6 and 7, the vanes 110 within the deflector ring 28 function to uniformly divide or partition the swirling flow of coal into a plurality of equal flows (e.g., coal flows 120) within each section 112, and to straighten the flow of coal through the deflector ring 28. In particular, the vanes 110 serve to transition the swirling flow within the reject cone 24 and along the outer periphery of the deflector ring 28 (having a substantially horizontal trajectory in many cases) into substantially vertical flows 120 within the sections 112 of the deflector ring 28 that then pass upwardly through the turret 26 and into the coal pipes 30, as best shown in FIG. 6. This straightening of the coal flow and the even distribution of the flow to the outlets 36 via use of static vanes 110 within the deflector ring 28 (see FIGS. 6 and 7) is an improvement over the prior art, where flow control of the pulverized coal has proven difficult because of the swirling within the deflector ring and turret, and which has heretofore contributed to an imbalance between the respective coal pipes 30 (see FIGS. 2 and 3).

In an embodiment, the use of static flow straightening vanes 110 within the deflector ring 28 may improve pipe-to-pipe coal flow balance to approximately +/−10% or better, as compared to a pipe-to-pipe imbalance of over 30% in some cases with existing systems. As indicated above, by uniformly distributing the flow of coal among each of outlets 36 in the turret 26 utilizing static flow straightening vanes 110 within the deflector ring 28, fouling and slagging may be minimized, combustion efficiency increased and emissions decreased, which leads to improved boiler efficiency and better overall performance as compared to existing systems.

Referring back to FIG. 5, in an embodiment, the vanes 110 may each include a plurality of sections that are selectively retractable and extendable in a vertical direction, which allows the total height of the vane(s) 110 to be adjusted (the vanes 110 are all fixed in the horizontal direction and are not pivotable about a vertical axis or horizontal axis). For example, as illustrated in FIG. 5, each vane 110 may include three sections including a first section 114, a second section 116, and a third section 118. While three sections are illustrated, the vanes 110 may have more or fewer than three sections without departing from the broader aspects of the present invention. The sections 114, 116, 118 are operatively connected to one another and are slidable relative to one another such that a total height of each vane 110 may be selectively adjusted. For example, in an embodiment, each of the vanes 110 may include a mechanism that allows for adjustment of the vertical height of each of the vanes 110. The mechanism may include a plurality of linkages (not shown), a linear screw (not shown), a rack and pinion, and/or other mechanism or device that allow one or more of the sections 114, 116, 118 to be moved vertically with respect to at least one other section 114, 116, 118 in order to selectively decease or increase the height of the vane 110. In an embodiment the height is adjustable between a minimum height, corresponding to a height of the tallest section, and a maximum height, corresponding approximately to the combined height of each of the sections 114, 116, 118.

This ability to adjust the vertical height of each of the vanes 110 by extending or retracting the sections 114, 116, 118 allows for additional control of the flow distribution of coal in the event that flow distribution between the coal pipes is still not uniform due to, for example, other variables within the system downstream from the pulverizer (such as, for example, differences in pipe lengths and numbers and types of elbows in each fuel line). In particular, in certain instances, even with the flow straightening vanes 110, downstream configurations and conditions may result in certain pressure imbalances between the coal pipes, which can lead to some remaining coal flow imbalance. The height of one or more of the vanes 110, however, may be adjusted in order to compensate for or remedy this imbalance. In an embodiment, the height of one or more of the vanes 110 may be adjusted in dependence upon a measured flow of coal within a coal outlet pipe or fuel line or in dependence upon, for example, measured emissions of a respective burner or boiler.

In an embodiment, the pulverizer 100 may be manufactured with the classifier 28 having the vanes 110 installed therein. In other embodiments, the classifier 28 having vanes 110 may be manufactured as a separate component that may be retrofit into existing pulverizers. In yet other embodiments, existing pulverizers, and classifiers thereof, may be retrofit with static flow straightening vanes 110 for improving the flow distribution of coal to the outlet pipes connected thereto. In this respect, the invention can be integrated into new power plant installations, as well as retrofit into the pulverizers of existing power generation systems. As a result, improved boiler efficiencies and decreased emissions may be realized, regardless of whether a new plant is being brought online, or an existing plant updated.

In an embodiment, a deflector ring for a pulverizer is provided. The deflector ring includes a generally annular body, and a plurality of static straightening vanes arranged interior to the body, the vanes dividing the body into a plurality of substantially equal sections. The vanes are configured to straighten a swirling flow of solid particles as they enter the annular body, and to divide the swirling flow into a plurality of straightened flows that are communicated to a turret positionable above the deflector ring. In an embodiment, the number of straightening vanes is equal to the number of coal outlet pipes in the pulverizer. In an embodiment, each of the straightening vanes is selectively extendable and retractable in a vertical direction for adjusting a height of each of the vanes. In an embodiment, the height of each straightening vane is designed to be individually adjusted. In an embodiment, each of the straightening vanes includes three segments. In an extended position the height of a respective vane is substantially equal to a combined height of the three segments, and in a retracted position the height of a respective vane is substantially equal to a height of a single segment. In an embodiment, a feed pipe extends through the annular body such that the feed pipe and the annular body are substantially concentric. In an embodiment, each of the straightening vanes extends radially from the feed pipe to an inner peripheral wall of the annular body. In an embodiment, the plurality of straightening vanes is seven straightening vanes. In an embodiment, the solid particles are pulverized coal particles.

In another embodiment, a method for controlling the output of coal in a plurality of coal outlet pipes in a coal pulverizer is provided. The method includes the steps of modifying, or retrofitting, a portion of a coal pulverizer with a deflector ring, the deflector ring comprising a generally annular body, and a plurality of static straightening vanes arranged interior to the body. The vanes divide the body into a plurality of substantially equal sections. In an embodiment, the portion of the coal pulverizer modified, or retrofit, with the deflector ring is a classifier section of the pulverizer. In an embodiment, the method may also include the steps of, within the classifier, generating a swirling flow of coal, within the deflector ring, dividing the swirling flow of coal into a plurality of flows equal in number to the number of sections within the deflector ring, and, within each of the sections of the deflector ring, straightening the flows of coal. In an embodiment, the method may also include the step of transporting the plurality of flows of coal upwardly through a turret of the pulverizer and into the plurality of coal outlet pipes, wherein the plurality of flows of coal are generally vertical through the turret. In an embodiment, the number of straightening vanes is equal to the number of coal outlet pipes in the pulverizer. In an embodiment, the method may also include the step of adjusting a height of at least one of the straightening vanes in dependence upon a detected coal flow imbalance between the coal outlet pipes. In an embodiment, each of the straightening vanes includes three segments. In an extended position the height of a respective vane is substantially equal to a combined height of the three segments, and in a retracted position the height of a respective vane is substantially equal to a height of a single segment. In an embodiment, a feed pipe extends through the annular body, the feed pipe and the annular body being substantially concentric. In an embodiment, each of the straightening vanes extends radially from the feed pipe to an inner peripheral wall of the annular body.

In yet another embodiment, a classifier for a coal pulverizer is provided. The classifier includes a plurality of classifier vanes arranged in an annular ring, and a deflector ring concentrically arranged within the annular ring. The deflector ring has a generally annular body and a plurality of static straightening vanes arranged interior to the body. The straightening vanes divide the body into a plurality of substantially equal sections. The classifier vanes are configured to generate a swirling flow of coal within the classifier. The straightening vanes within the annular body are configured to straighten the swirling flow of coal as it enters the annular body, and to divide the swirling flow into a plurality of straightened flows that are communicated to a turret positioned above the classifier. In an embodiment, the classifier further includes a reject cone positioned below the annular ring. The reject cone is configured to receive coal particles rejected by the classifier and to transport the rejected coal particles to a grinding platform of the pulverizer. In an embodiment, each of the straightening vanes is selectively extendable and retractable in a vertical direction for adjusting a height of each of the straightening vanes. In an embodiment, each of the straightening vanes includes three segments. In an extended position the height of a respective straightening vane is substantially equal to a combined height of the three segments, and in a retracted position the height of a respective straightening vane is substantially equal to a height of a single segment.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for modifying a coal pulverizer to control an output of coal in a plurality of coal outlet pipes in the coal pulverizer, the method comprising the steps of:

modifying, or retrofitting, a portion of the coal pulverizer with a deflector ring, the deflector ring comprising:
an annular body; and
a plurality of straightening vanes arranged interior to the body, the vanes dividing the body into a plurality of sections, wherein each of the straightening vanes includes:
at least three segments, wherein:
a first segment having a greatest height, in an extended position the height of a respective vane is equal to a combined height of the three segments, and in a retracted position the height of a respective vane is equal to a height of the first segment;
a second segment having a first height configured to convert a swirling flow of coal into a vertical flow of coal, and
at least one extendible segment to selectively extend the straightening vane beyond the first height;

measuring an emissions output of a burner or boiler connected to the coal pulverizer to detect a coal flow imbalance between the plurality of coal outlet pipes; and extending or retracting the at least one extendible segment of the at least one of the plurality of straightening vanes to reduce the detected coal flow imbalance between the plurality of coal outlet pipes.

2. The method according to claim 1, wherein:
the portion of the coal pulverizer modified, or retrofit, with the deflector ring is a classifier section of the coal pulverizer.

3. The method according to claim 2, further comprising the steps of:
within the classifier, generating the swirling flow of coal;
within the deflector ring, dividing the swirling flow of coal into a plurality of flows equal in number to the number of sections within the deflector ring; and
within each of the sections of the deflector ring, outputting vertical flows of coal via one of the segments of each of the plurality of straightening vanes.

4. The method according to claim 3, further comprising a step of:
transporting the plurality of flows of coal upwardly through a turret of the coal pulverizer and into the plurality of coal outlet pipes;
wherein the plurality of flows of coal are vertical through the turret.

5. The method according to claim 1, wherein:
the number of straightening vanes is equal to the number of coal outlet pipes in the coal pulverizer.

6. The method according to claim 1, further comprising:
a feed pipe extends through the annular body, the feed pipe and the annular body being concentric; and
wherein each of the straightening vanes extends radially from the feed pipe to an inner peripheral wall of the annular body.

7. A method for controlling the output of coal in a plurality of coal outlet pipes in a coal pulverizer, the method comprising the steps of:
modifying, or retrofitting, a portion of the coal pulverizer with a deflector ring, the deflector ring comprising:
an annular body; and
a plurality of straightening vanes arranged interior to the body, the vanes dividing the body into a plurality of sections, wherein each of the straightening vanes includes:
at least three segments, wherein:
a first segment having a greatest height, in an extended position the height of a respective vane is equal to a combined height of the three segments, and in a retracted position the height of a respective vane is equal to a height of the first segment
a second segment having a first height configured to convert a swirling flow of coal into a vertical flow of coal, and
at least one extendible segment to selectively extend the straightening vane beyond the first height;
within the classifier, generating a swirling flow of coal;
within the deflector ring, dividing the swirling flow of coal into a plurality of flows equal in number to the number of sections within the deflector ring;
within each of the sections of the deflector ring, outputting vertical flows of coal via one of the segments of each of the plurality of straightening vanes;
measuring a pressure imbalance between the plurality of coal outlet pipes to detect a coal flow imbalance between the plurality of coal outlet pipes; and
extending or retracting the at least one extendible segment of the at least one of the plurality of straightening vanes to reduce the coal flow imbalance between the plurality of outlet coal pipes.

8. The method according to claim 7, wherein:
the portion of the coal pulverizer modified, or retrofit, with the deflector ring is a classifier section of the coal pulverizer.

9. The method according to claim 7, further comprising a step of:
transporting the plurality of flows of coal upwardly through a turret of the coal pulverizer and into the plurality of coal outlet pipes;
wherein the plurality of flows of coal are vertical through the turret.

10. The method according to claim 7, wherein:
the number of straightening vanes is equal to the number of coal outlet pipes in the coal pulverizer.

11. The method according to claim 7, wherein:
a feed pipe extends through the annular body, the feed pipe and the annular body being concentric; and
wherein each of the straightening vanes extends radially from the feed pipe to an inner peripheral wall of the annular body.

* * * * *

UNITED STATES PATENT AND TRADEMARK OFFICE
CERTIFICATE OF CORRECTION

| | | |
|---|---|---|
| PATENT NO. | : 10,773,261 B2 | Page 1 of 1 |
| APPLICATION NO. | : 15/055978 | |
| DATED | : September 15, 2020 | |
| INVENTOR(S) | : Joseph David Bianca and Paul John Chapman | |

It is certified that error appears in the above-identified patent and that said Letters Patent is hereby corrected as shown below:

On the Title Page

In item (73), under "Assignee," delete "Assignee: General Electric Company, Schenectady, NY" and insert --Assignee: General Electric Technology GMBH, Baden (CH)--, therefor Signed and Sealed this
Second Day of March, 2021

Drew Hirshfeld
*Performing the Functions and Duties of the
Under Secretary of Commerce for Intellectual Property and
Director of the United States Patent and Trademark Office*